United States Patent
Heilenbach et al.

(10) Patent No.: US 7,280,950 B2
(45) Date of Patent: Oct. 9, 2007

(54) LOCOMOTIVE DIESEL ENGINE TURBOCHARGER AND TURBINE STAGE CONSTRUCTED WITH TURBINE BLADE VIBRATION SUPPRESSION METHODOLOGY

(75) Inventors: James W. Heilenbach, Riverside, IL (US); Anthony T. Chobot, Orland Park, IL (US); Daniel J. Meyerkord, Burr Ridge, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 469 days.

(21) Appl. No.: 10/762,396

(22) Filed: Jan. 22, 2004

(65) Prior Publication Data

US 2005/0160598 A1    Jul. 28, 2005

(51) Int. Cl.
   *G06F 7/48*   (2006.01)
(52) U.S. Cl. .............. 703/7; 703/6; 415/160; 415/48; 415/90; 415/164; 60/223; 60/602; 60/605.2
(58) Field of Classification Search .......... 703/8, 703/7; 415/160, 48, 90, 164; 60/223, 602, 60/605.2, 39.25; 416/96 R, 224; 417/407
See application file for complete search history.

(56) References Cited

U.S. PATENT DOCUMENTS

| | | | | |
|---|---|---|---|---|
| 4,292,531 A | * | 9/1981 | Williamson | 290/14 |
| 4,657,476 A | * | 4/1987 | Berg | 415/48 |
| 4,786,233 A | * | 11/1988 | Shizuya et al. | 416/97 R |
| 5,224,457 A | * | 7/1993 | Arsenault et al. | 123/526 |
| 5,307,632 A | * | 5/1994 | Gottemoller et al. | 60/608 |
| 5,372,485 A | * | 12/1994 | Sumser et al. | 417/407 |
| 5,524,341 A | * | 6/1996 | Ferleger et al. | 29/889.7 |
| 5,887,419 A | * | 3/1999 | Rowe et al. | 60/223 |
| 6,062,026 A | * | 5/2000 | Woollenweber et al. | 60/605.2 |
| 6,094,989 A | * | 8/2000 | Twerdochlib | 73/659 |
| 6,542,859 B1 | * | 4/2003 | Burns et al. | 703/7 |
| 6,557,347 B1 | * | 5/2003 | Alvarez et al. | 60/611 |

(Continued)

OTHER PUBLICATIONS

Kaneko et al., "Reduction of vibratory stress of compressor blade by use of asymmetric vane spacing", Proceedings of the International Turbine Congress, Nov. 2003.*

(Continued)

*Primary Examiner*—Kandasamy Thangavelu
(74) *Attorney, Agent, or Firm*—Cook, Alex, McFarron, Manzo, Cummings & Mehler, Ltd.

(57) ABSTRACT

A method for fabrication of a locomotive diesel engine turbocharger turbine stage so as to avoid harmonic vibration in the turbine blades when the engine is operated at preselected throttle settings. Upon determining throttle settings for the engine and modeling of the turbocharger therefor, at least one natural vibration frequency of the turbine blades and a turbine nozzle vane excitation frequency as a function of turbocharger rotation speed are determined. Then the data obtained is analyzed to ascertain whether at least one data coincidence, that is whether a rotation speed correlative of a throttle setting has a coincidence over a predetermined range of both a natural frequency and said turbine vane nozzle excitation. If not, the model is suitable for fabrication of the turbocharger; if so, the model is modified by changing blade stiffness and/or vane numbering until no data coincidences are present.

16 Claims, 3 Drawing Sheets

U.S. PATENT DOCUMENTS

| | | | |
|---|---|---|---|
| 6,729,134 B2* | 5/2004 | Arnold et al. | 60/602 |
| 7,003,940 B2* | 2/2006 | Groppi et al. | 60/39.25 |
| 2002/0057969 A1* | 5/2002 | Namura et al. | 416/238 |
| 2002/0081194 A1* | 6/2002 | Garrett | 415/164 |
| 2002/0175521 A1* | 11/2002 | Dunsworth et al. | 290/40 A |
| 2003/0082053 A1* | 5/2003 | Jackson et al. | 416/224 |
| 2003/0194320 A1* | 10/2003 | Villhard | 416/96 A |
| 2004/0101402 A1* | 5/2004 | Garrett et al. | 415/160 |
| 2004/0216457 A1* | 11/2004 | Shea et al. | 60/608 |
| 2005/0111975 A1* | 5/2005 | Sidwell et al. | 416/96 R |
| 2005/0169743 A1* | 8/2005 | Hicks | 415/90 |

OTHER PUBLICATIONS

Japikse, "Decisive factors in Advanced centrifugal compressor design and developmemt", Proceedings of IMechE, 2000.*

Iwaki et al., "Blade-strength assessment of a marine turbocharger under development", Proceedings of the International Turbine Congress, Nov. 2003.*

D.Filsinger et al., "Approach to unidirectional coupled CFD-FEM analysis of axial turbocharger turbine blades", Journal of turbomachinery, Jan. 2002.*

* cited by examiner

LOCOMOTIVE DIESEL ENGINE TURBOCHARGER AND TURBINE STAGE CONSTRUCTED WITH TURBINE BLADE VIBRATION SUPPRESSION METHODOLOGY

TECHNICAL FIELD

The present invention relates to locomotive diesel engines, and more particularly the turbochargers therefor. Still more particularly, the present invention relates to a methodology for fabrication of the turbine stage of a locomotive turbocharger so that, when the engine is operating, harmonic vibration in the turbine blades will be suppressed.

BACKGROUND OF THE INVENTION

Diesel engines are widely used for locomotive applications. These diesel engines typically include a turbocharger. As can be understood from FIG. 1, a conventional turbocharger 10 includes a compression stage 12 for compressing incoming air 16 and a turbine stage 14 for driving the compression stage using engine exhaust 30. The compression stage 12 takes the incoming air 16 and compresses it using a plurality of compressor blades 18 of a rotating compressor wheel 20 in conjunction with a stationary compression casing 22. The compressed air 36 is then expelled at a compressed air port 24. In order to rotatively drive the compressor wheel 20, the turbine stage 14 (see also FIG. 2) has a stationary turbine nozzle 26 composed of a plurality of turbine nozzle vanes 28 which direct the engine exhaust 30 onto a plurality of turbine blades 32 of a turbine wheel 34. The engine exhaust then vents through an exhaust air port 36. Since the turbine wheel 34 is drivingly connected to the compressor wheel 20, induced rotation of the turbine wheel provides rotation of the compressor wheel.

The diesel engine is typically operated at a set of throttle settings (or notches), each of which defines a specific engine load and speed for the locomotive. Each of these specific throttle settings cause the turbocharger to operate at discrete rotational speeds which correlate to the throttle settings. Also, the locomotive and engine control systems are typically designed to have safeguards which at times control the engine load and speed, turbocharger rotational speed, or other parameters which would also cause the rotational speed of the turbocharger to operate in a defined range.

It is a well-known physical property of metals that a fatigue failure will occur in a metal component if it endures a sufficiently large number of damaging stress cycles. A large number of stress cycles will occur over a short time period if the component is excited at one of its natural vibration (harmonic) frequencies. In this regard, the configuration (i.e., geometry) and material composition properties of the turbine blades define their natural frequencies.

One known source of vibrational excitation energy in turbochargers is aerodynamic excitation caused by movement of a turbine blade past the wake of a turbine nozzle vane. A turbine blade will pass a fixed number of the turbine nozzle vane wakes with each revolution of the turbine wheel. The number of turbine nozzle vanes and operating speed of the turbocharger will define the aerodynamic excitation frequency. The turbine blades are susceptible to high cycle fatigue failure if the excitation frequency or a harmonic of the excitation frequency is near one of the turbine blades natural vibration frequencies.

In that locomotive diesel engines must comply with current and future EPA emission regulations, there is a desire for the locomotive turbocharger to operate at high maximum speeds and new throttle settings of the engine. Problematically in this regard, a particular turbocharger may be operating in a diesel engine in which certain of the desired throttle settings may undesirably involve natural vibration frequencies of the turbine blades. This untoward situation would dictate that the locomotive and/or engine control system force operation of the engine only at throttle settings where the turbine nozzle induced excitation is not present. Unfortunately, this can result in the engine being operated below maximum power, at other than desired throttle settings and/or have sub-optimal fuel economy. Alternatively, one known "solution" is to utilize a turbine blade lacing wire which is installed through a respective hole in the turbine blades which dampens turbine blade vibration and thereby alters the natural vibration frequency of the turbine blades. Problematically, the manufacture and assembly associated with turbine blade lacing wire is significantly more expensive and complicated than a turbine stage fabricated without turbine blade lacing wire. Yet another known "solution" relates to using turbine blade contact with a turbine blade shroud. The turbine blade shroud is an attached (usually cast in) platform that is perpendicular to the axis of the turbine blades, and is in contact therewith. The turbine blade shroud contact with the turbine blades will alter the natural vibration frequency of the turbine blades, and friction caused by the mutual contact will damp vibrations. Unfortunately, this involves the same associated manufacturing and assembly issues as the lacing wire.

What remains needed in the art is a methodology for fabrication of the turbine stage of a locomotive turbocharger which ensures avoidance of natural vibration frequency of the turbine blades at desired throttle settings of the engine.

SUMMARY OF THE INVENTION

The present invention is a methodology for fabrication of the turbine stage of a locomotive turbocharger which ensures avoidance of natural vibration frequency of the turbine blades at desired throttle settings of the engine, wherein the problem of natural vibration frequency is directly addressed by physically configuring the turbine stage, rather than, as is the past practice in the art, avoiding the problem by using control system and/or component add-on strategies.

The turbine stage design fabrication method according to the present invention provides prediction, in advance of actual fabrication of a turbine stage of a locomotive turbocharger, of high cycle vibration fatigue of the turbine blades based upon the modeling of the turbine blades and of the turbine nozzle vanes. Therefore, the present invention provides a fabrication model of the turbine stage of a turbocharger, wherein when actually fabricated, harmonic excitations of the turbine blades are avoided at defined throttle settings of the locomotive diesel engine.

According to the method of the present invention, a first step involves defining desired throttle settings of the locomotive diesel engine, which thereupon correlates to discrete rotational speeds of the turbine wheel of the turbocharger. A next step is to model a turbocharger for the engine, including a turbine stage thereof. A next step is to determine the natural vibration frequencies of the turbine blades for the model. A further step is to determine turbine nozzle vane aerodynamic excitation frequency as a function of turbine wheel rotation speed for the model. Then, in a next step, data acquired from the preceding steps is analyzed to ascertain any data coincidence of: (1) throttle setting turbine wheel rotation speed, (2) turbine blade natural frequency, and (3) turbine blade aerodynamic excitation frequency as a function of turbine wheel rotation speed (the turbine vane nozzle excitation). More particularly, the ascertaining process involves determining whether, at any rotation speed of the turbocharger, there is a coincidence of at least one natural frequency of the turbine blades and the turbine vane nozzle excitation, wherein if there is an absence of any data coincidence, then the model provides a fabrication model for a turbine stage that, once fabricated and in operation, would be at least substantially free of harmonically resonant vibration. In this regard, a "data coincidence" means a predetermined range of proximity of each of a rotation speed, a frequency of the natural frequencies, and the turbine vane nozzle excitation.

If no data coincidences are found, then the model succeeds, and turbine stage may be fabricated in confidence that none of the throttle settings will involve natural vibration frequencies of the turbine blades. However, if one or more data coincidences are discovered, then the model must be revised in order to eliminate any data coincidences and thereby avoid natural vibration frequencies of the turbine blades being present at the throttle settings of the engine. Since the throttle settings are desired for proper engine and locomotive operation, the model revision focuses on turbine blade modification (as, for example, reconfiguration (of geometry) and/or material composition of the blades, wherein changing the stiffness of the blades results in a change in natural vibration frequencies of the blades) and turbine nozzle vane number modification, wherein an odd number of vanes (as opposed to the conventional practice of an even number of vanes), preferably a prime number, provides simple amplitude excitations. By modifying the turbine blades, the natural vibration frequencies of the turbine blades are changed. By modifying the number of turbine nozzle vanes, the turbine blade aerodynamic excitation frequency as a function of turbine wheel rotation speed is changed. Either one, or both, of the turbine blade configuration and the number of turbine nozzle vanes may be altered so as to avoid data coincidences in a new model. Once altering is completed, the above process is repeated to ascertain if any data coincidences remain in the new model. The process of remodeling is repeated until a turbine stage is configured having no data coincidences, whereupon fabrication of the turbocharger can commence with confidence.

As a consequence of the method according to the present invention, since possible data coincidences have been ascertained, the region of safe operation of the turbocharger can be changed as desired. A new throttle setting may thereupon be selected for the diesel engine, with a correlation to a new discrete rotational speed of the turbocharger, without encountering a data coincidence.

Accordingly, it is an object of the present invention to provide a methodology for fabrication of the turbine stage of a locomotive turbocharger which ensures avoidance of natural vibration frequency of the turbine blades at desired throttle settings of the engine.

This and additional objects, features and advantages of the present invention will become clearer from the following specification of a preferred embodiment.

DESCRIPTION OF THE PREFERRED EMBODIMENT

Figure 1:
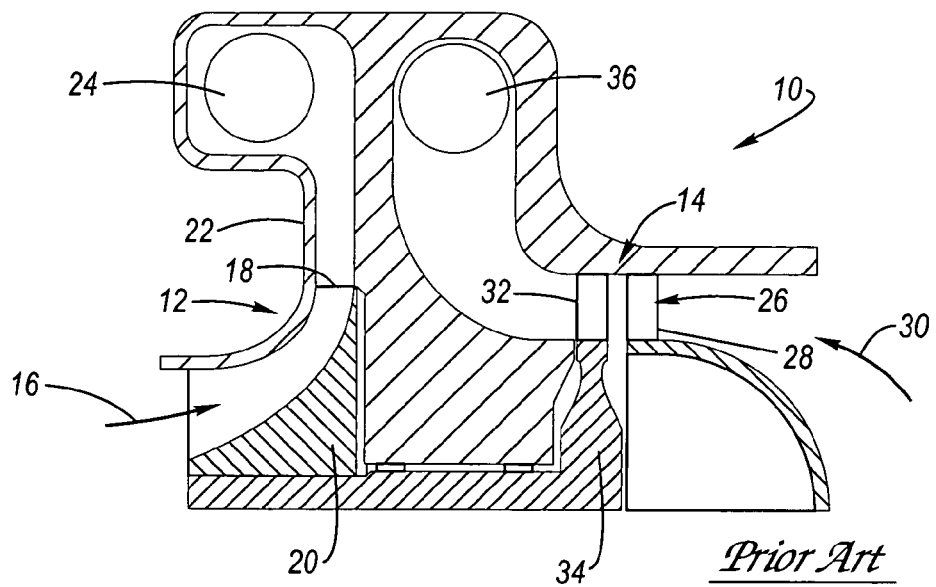
FIG. 1 is a partly sectional schematic side view of a prior art turbocharger of a diesel engine.
Figure 2:
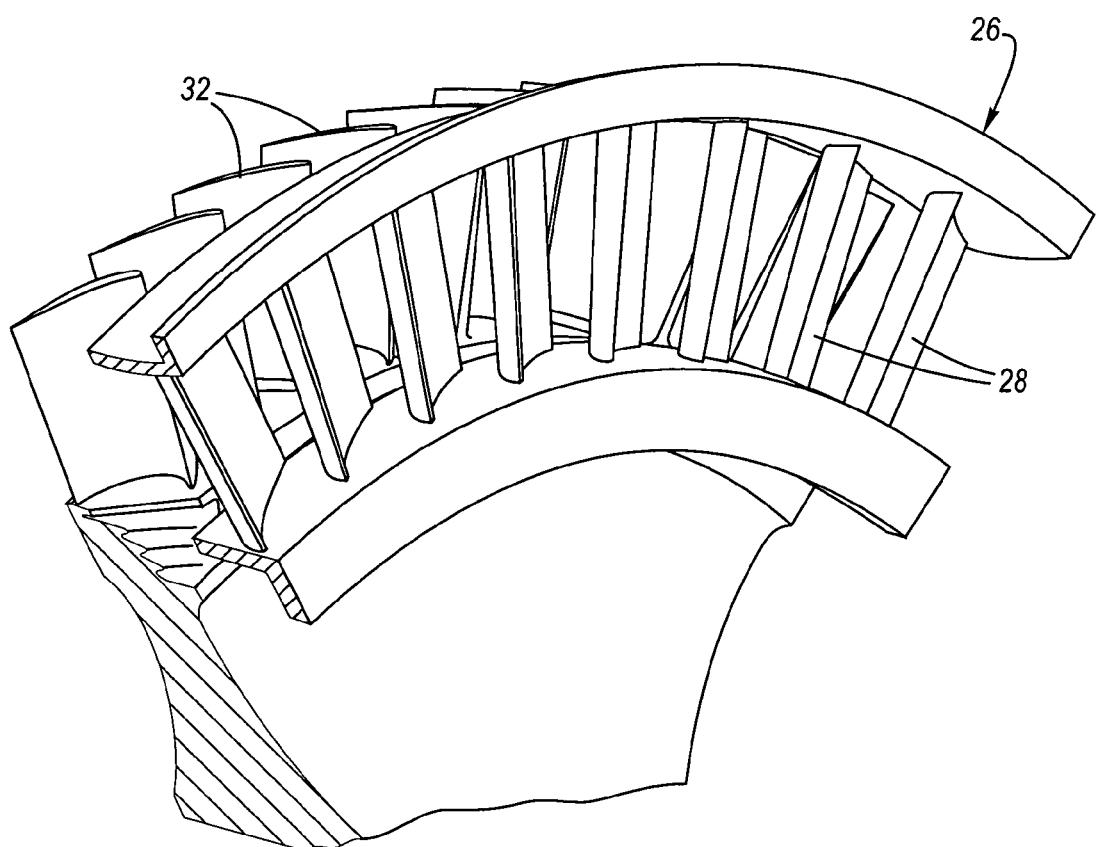
FIG. 2 is a broken-away, perspective view showing the turbine blades and turbine nozzle vanes of the turbocharger of FIG. 1.

Referring now to the drawings, FIGS. 3 through 6B depict various aspects for carrying out a method for locomotive turbocharger turbine stage fabrication according to the present invention.

The present invention provides a pre-fabrication analysis of the turbine stage of a locomotive diesel engine turbocharger to ensure that the turbine stage, when actually fabricated, will have minimized turbine blade high cycle fatigue failure because of planned avoidance of natural vibration frequencies of the turbine blades at any of the desired throttle settings of the engine. The implementation of the invention involves directed modification of the modeled structure of the turbine stage, wherein the problem of natural vibration frequency is addressed by physically reconfiguring the modeled turbine stage, rather than, as has is the past practice in the art, avoiding the problem by using control system and/or component add-on strategies. The reduced risk of turbine stage failure at high turbocharger speeds provides improved locomotive functionality.

Figure 3:
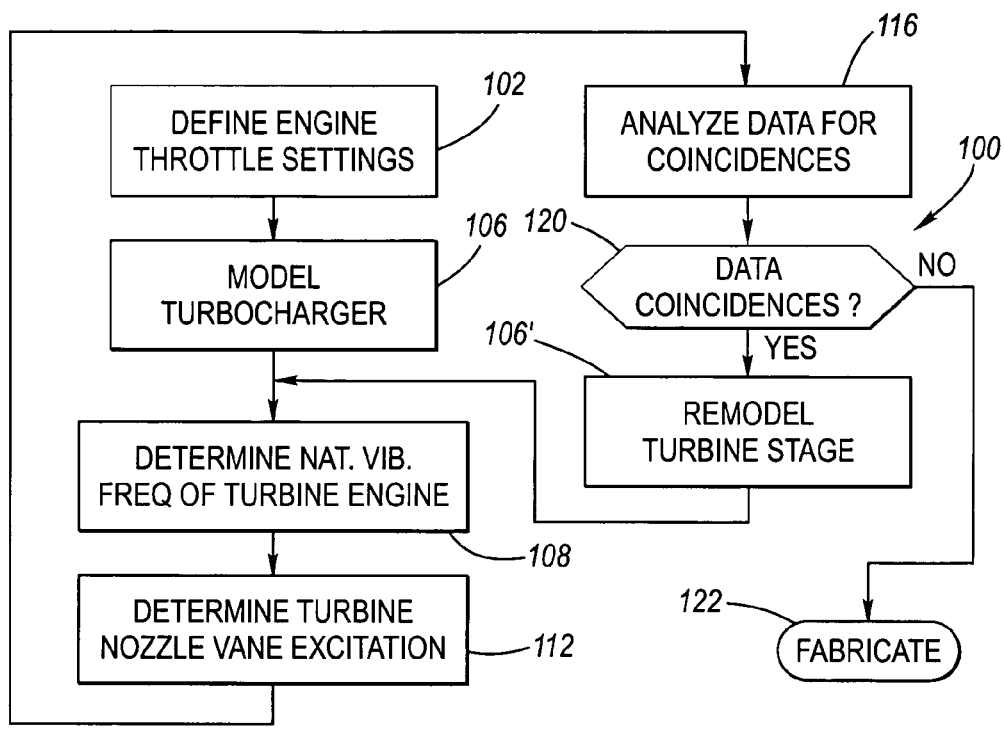
FIG. 3 is an algorithm for carrying out the method for turbine stage fabrication prediction according to the present invention.
Figure 4:
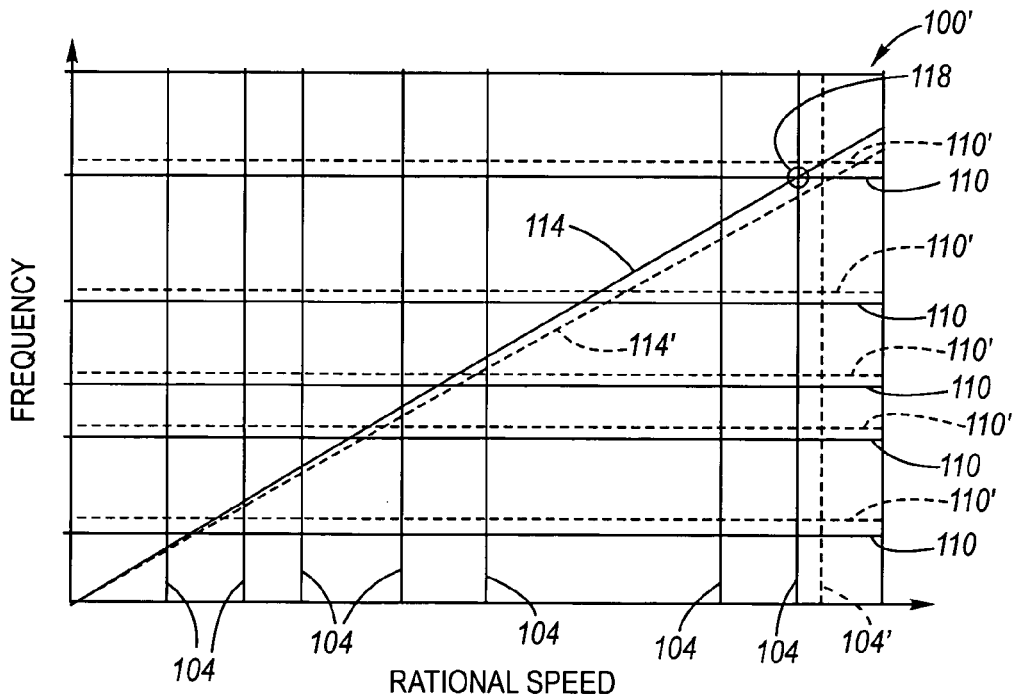
FIG. 4 is an interference diagram for visually ascertaining data coincidences according to the method of the present invention.

Referring now to FIGS. 3 and 4, a method for carrying out the present invention will be detailed according to a non-limiting, exemplar preferred embodiment thereof, wherein FIG. 3 depicts an algorithm 100 for carrying out the method of the present invention which can be implemented electronically, as for example by suitable programming of a microprocessor, and FIG. 4 is an interference diagram 100' for visually ascertaining the presence of data coincidences pursuant to the algorithm.

At execution block 102 (see FIG. 3), desired throttle settings of the locomotive diesel engine are determined, which thereupon correlates to discrete rotational speeds (see plots 104 of FIG. 4) of the turbine wheel of a turbocharger to be used with the engine. At execution block 106, a configuration model is devised for a turbine stage of the turbocharger. At execution block 108 the natural vibration frequencies of the turbine blades for the model are determined. The natural vibration frequencies are determined by any of a number of techniques, including but not limited to finite element analysis and holographic or strain gage measurement, all of which being well known in the art, using either a suitable software routine and modeled turbine stage or measurements on previously fabricated turbine blades (see plots 110 of FIG. 4). At execution block 112, based upon configuration of the turbine stage, turbine nozzle vane aerodynamic excitation frequency as a function of turbine wheel rotation speed for the model is determined. The aerodynamic excitation frequency as a function of turbine wheel rotation speed is determined mathematically (see plot 114 of FIG. 4). At execution block 116 the data from execution blocks 102, 108 and 112 are analyzed to ascertain if any data coincidences exist.

A "data coincidence" can be understood by reference to the interference diagram 100' of FIG. 4. A data coincidence 118 involves a range of proximity of coincidence of the obtained data. More particularly, a data coincidence 118 occurs when, at a discrete rotation speed 104 of the turbocharger (which correlates to a selected throttle setting of the diesel engine), there is a coincidence of natural frequency 110 of the turbine blades and the turbine vane nozzle aerodynamic excitation 114, the coincidence being over a predetermined range of proximity of each of the rotation speed 104, the natural frequency 110, and the turbine vane nozzle excitation 114. The range of proximity of a data coincidence 118 is selected, for example, based upon acceptable turbine blade life vis-a-vis what level of harmonic oscillations may be present at the limit of the range of proximity.

At decision block 120, the presence of any data coincidences is inquired. The presence of a data coincidence 118 is indicative of the presence of a situation in which the turbine blades at a particular throttle setting will be subject to harmonic oscillations resonantly driven by excitation frequency of the turbine nozzle. If the inquiry regarding the presence of a data coincidence is answered in the affirmative, then at execution block 106' the turbine stage of the turbocharger is remodeled to avoid the at least one data coincidence. If the answer to the inquiry of decision block 120 is answered in the negative, then the model is acceptable and the algorithm ends at block 122, whereupon the turbine stage of the turbocharger is physically fabricated.

FIGS. 5A through 6B depict non-limiting examples of how execution block 106' may be implemented.

Figure 5A:
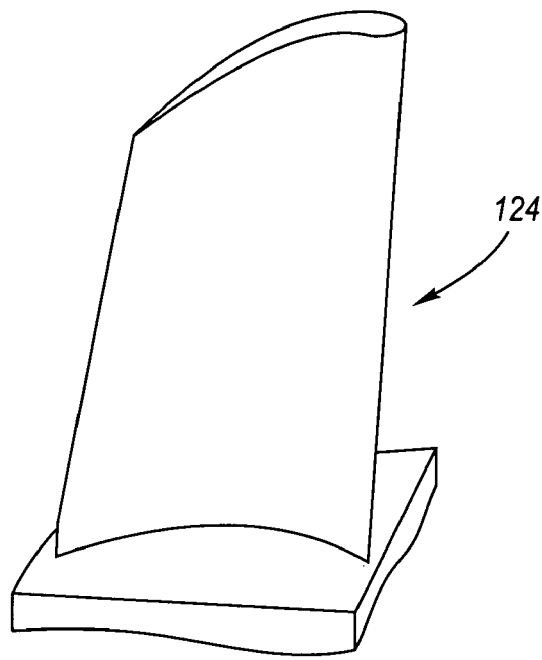
FIGS. 5A and 5B depict successive models of the turbine blades, the succession being according to the method of the present invention.
Figure 5B:
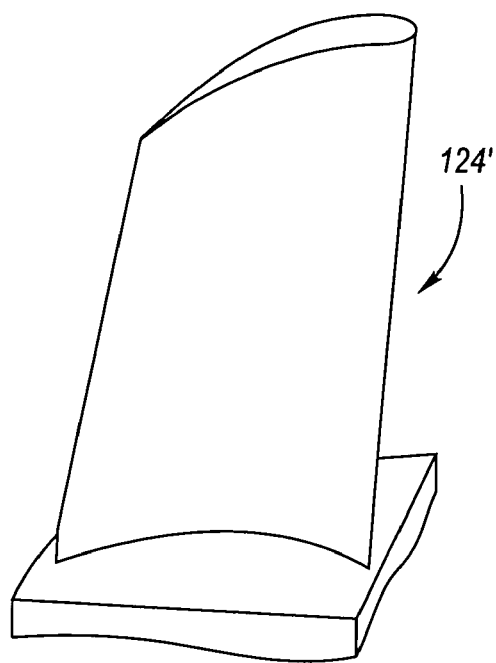

At FIG. 5A, the turbine blades 124 have a configuration and material composition which provide the natural frequencies 110 of FIG. 4. In implementing execution block 106', the turbine blades 124' are modified so as to change the stiffness so as to provide new natural frequencies 110' which are different from the natural frequencies 110. For example, the blades may be made stiffer by increasing their cross-section (as shown at FIG. 5B) and/or by change of material composition of the blades. It will be seen from the interference diagram 100' that the are no data coincidences of plots 104, 110', and 114 so that the algorithm for this remodeled turbocharger will successfully pass to block 122. In this regard, the turbine blade stiffness may be increased or decreased so as to avoid data coincidences.

Figure 6A:
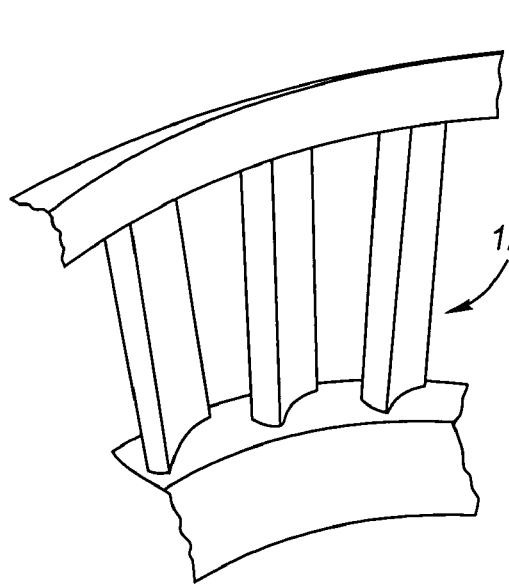
FIGS. 6A and 6B depict successive models of the turbine nozzle vanes, the succession being according to the method of the present invention.
Figure 6B:
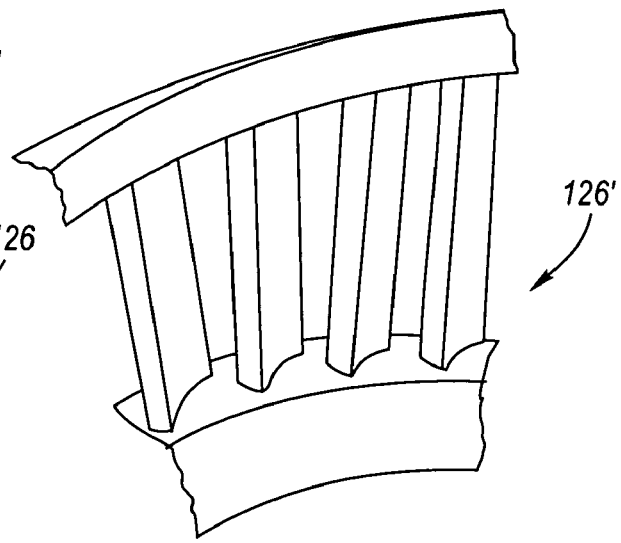

At FIG. 6A, the turbine nozzle vanes 126 have a configuration which provide the aerodynamic excitation frequency as a function of turbine wheel rotation speed 114 of FIG. 4. In implementing execution block 106', the turbine nozzle vanes 126' are modified by changing the number of vanes (FIG. 6B shows an extra vane being added), so as to provide a new aerodynamic excitation frequency as a function of turbine wheel rotation speed 114' which has a slope different from that of the slope of the aerodynamic excitation frequency as a function of turbine wheel rotation speed 114. It will be seen from the interference diagram 100' that the are no data coincidences of plots 104, 110, and 114' so that the algorithm for this remodeled turbine stage of the turbocharger will successfully pass to block 122. In this regard, the slope of the aerodynamic excitation frequency as a function of turbine wheel rotation speed can be changed by either increasing or decreasing the number of vanes.

Since the throttle settings are desired for proper engine and locomotive operation, the algorithm 100 implements the turbocharger model revision by changes to the turbine stage, in particular to changes in the turbine blades (i.e., configuration and/or composition) and/or to changes in the number of turbine nozzle vanes, wherein an odd number of vanes, preferably a prime number, provides simple amplitude excitations. By modifying the turbine blades, the natural vibration frequencies of the turbine blades are changed. By modifying the number of turbine nozzle vanes, the turbine blade aerodynamic excitation frequency as a function of turbine wheel rotation speed is changed. Either one, or both, of the turbine blade and turbine nozzle vane configurations may be reconfigured in the model. Once reconfiguring is completed, the algorithm proceeds from execution block 106' to execution block 108 and then proceeds further as described hereinabove and is repeated as necessary until block 122 is attained, wherein a turbine stage is configured having no data coincidences, and whereupon fabrication commences with confidence.

As a consequence of the method according to the present invention, once ascertainment of possible data coincidences has been performed, the region of safe operation of the turbocharger can be changed as desired. In this regard, one or more new throttle settings may thereupon be selected, with a correlation to a new discrete rotational speed of the turbocharger, without encountering a data coincidence. For example, FIG. 4 depicts a new discrete rotation speed 104' of the turbocharger as a result of selection of a new, higher speed throttle setting of the diesel engine, wherein it will be seen that there is no data coincidence of natural frequency 110 of the turbine blades and the turbine vane nozzle aerodynamic excitation 114 at the rotation speed 104'. Thus, the diesel engine operation is more efficient and/or has lower emissions, wherein the operation of the locomotive is at optimum power and fuel economy.

It is to be understood that the algorithm 100 is preferably (but not necessarily) implemented electronically using a suitably programmed microprocessor, and that execution block 116 and decision block 120 would then be implemented electronically by the microprocessor and its programming without utilization of the interference diagram 100', which is provided herein merely for expository purposes.

To those skilled in the art to which this invention appertains, the above described preferred embodiment may be subject to change or modification. Such change or modification can be carried out without departing from the scope of the invention, which is intended to be limited only by the scope of the appended claims.

The invention is claimed is:

1. A method for fabrication of a diesel engine turbocharger turbine stage, comprising the steps of:
   selecting a set of discrete throttle settings for the engine, wherein the selected discrete throttle settings correlate to discrete rotational speeds of the turbocharger;
   modeling the turbocharger for the engine, including modeling of the turbine stage thereof for vibration analysis, said modeling of the turbine stage further comprising modeling of turbine blades of a turbine wheel and modeling turbine nozzle vanes;
   determining one or more natural frequencies of vibration of the turbine blades for each of the throttle settings;
   determining a turbine nozzle vane induced turbine blade excitation frequency as a function of the turbocharger rotational speed at that throttle setting; and
   ascertaining whether a data coincidence is present at each of the throttle settings, said step of ascertaining comprising determining whether, at the rotational speed corresponding to that throttle setting, there is a data coincidence of said one or more natural frequencies of vibration and said turbine nozzle vane induced turbine blade excitation frequency;

wherein if there is an absence of said data coincidence at each of the throttle settings, the turbine stage fabricated according to said step of ascertaining will have turbine blades which are at least substantially free of harmonically resonant vibrations at the discrete rotational speeds of the turbocharger.

2. The method of claim 1, wherein the data coincidence comprises a predetermined range of proximity of the rotational speed corresponding to each throttle setting, said one or more natural frequencies of vibration at that throttle setting, and said turbine nozzle vane induced turbine blade excitation frequency at that throttle setting.

3. The method of claim 2, further comprising fabricating the turbocharger according to said step of ascertaining whether a data coincidence is present at each of the throttle settings for the engine, wherein said step of ascertaining indicates that the turbocharger is free of said data coincidence at each of the throttle settings, indicating absence of harmonically resonant vibrations at the discrete rotational speeds of the turbocharger.

4. The method of claim 2, wherein when a presence of any data coincidence is determined by the step of ascertaining, modifying at least one of configuration and material composition of the turbine blades.

5. The method of claim 4, further comprising repeating:
the step of modeling, wherein the repeating of said step of modeling comprises remodeling of turbine blades of the turbine wheel for vibration analysis;
the step of determining one or more natural frequencies of vibration of the turbine blades for each of the throttle settings;
the step of determining the turbine nozzle vane induced turbine blade excitation frequency as a function of the turbocharger rotational speed at that throttle setting;
the step of ascertaining whether a data coincidence is present at each of the throttle settings; and
the step of modifying at least one of configuration and material composition of the turbine blades;
until the absence of data coincidence at the rotational speed corresponding to each throttle setting is obtained.

6. The method of claim 2, further comprising fabricating the turbocharger according to said step of ascertaining whether a data coincidence is present at each of the throttle settings for the engine, wherein:
when a presence of any data coincidence is determined by the step of ascertaining, modifying at least one of configuration and material composition of the turbine blades; and
repeating:
the step of modeling, wherein the repeating of said step of modeling comprises remodeling of turbine blades of the turbine wheel for vibration analysis;
the step of determining one or more natural frequencies of vibration of the turbine blades for each of the throttle settings;
the step of determining the turbine nozzle vane induced turbine blade excitation frequency as a function of the turbocharger rotational speed at that throttle setting;
the step of ascertaining whether a data coincidence is present at each of the throttle settings; and
the step of modifying at least one of configuration and material composition of the turbine blades;
until the absence of data coincidence at the rotational speed corresponding to each throttle setting is obtained.

7. The method of claim 2, wherein said step of modeling further includes selecting a number of said turbine nozzle vanes; further when a presence of any data coincidence is determined by the step of ascertaining, further changing the number of said turbine nozzle vanes and remodeling turbine nozzle vanes.

8. The method of claim 7, wherein the step of remodeling of the turbine nozzle vanes further includes selecting an odd, prime number of turbine nozzle vanes.

9. The method of claim 2, further comprising fabricating the turbocharger according to said step of ascertaining whether a data coincidence is present at each of the throttle settings for the engine, wherein:
when a presence of any data coincidence is determined by the step of ascertaining, changing the number of said turbine nozzle vanes and remodeling turbine nozzle vanes such that there are no harmonically resonant vibrations at the discrete rotational speeds of the turbocharger corresponding to discrete throttle settings of the diesel engine;
wherein an odd, prime number of turbine nozzle vanes is selected when changing the number of said turbine nozzle vanes.

10. A turbocharger turbine stage for a diesel engine fabricated such that it is free of harmonically resonant vibrations at a set of discrete rotational speeds of the turbocharger corresponding to a set of discrete throttle settings for the engine, wherein an absence of harmonically resonant vibrations at discrete rotational speeds is determined by a method comprising:
selecting the set of discrete throttle settings for the engine, wherein the selected discrete throttle settings correlate to discrete rotational speeds of the turbocharger;
modeling the turbocharger for the engine, including modeling of the turbine stage thereof for vibration analysis, said modeling of the turbine stage further comprising modeling of turbine blades of a turbine wheel and modeling turbine nozzle vanes;
determining one or more natural frequencies of vibration of the turbine blades for each of the throttle settings;
determining a turbine nozzle vane induced turbine blade excitation frequency as a function of the turbocharger rotational speed at that throttle setting; and
ascertaining whether a data coincidence is present at each of the throttle settings, said step of ascertaining comprising determining whether, at the rotational speed corresponding to that throttle setting, there is a data coincidence of said one or more natural frequencies of vibration and said turbine nozzle vane induced turbine blade excitation frequency;
wherein if there is an absence of said data coincidence at each of the throttle settings, the turbine stage fabricated according to said step of ascertaining will have turbine blades which are at least substantially free of harmonically resonant vibrations at the discrete rotational speeds of the turbocharger.

11. A turbocharger turbine stage for a diesel engine fabricated such that it is free of harmonically resonant vibrations at a set of discrete rotational speeds of the turbocharger corresponding to a set of discrete throttle settings for the engine, wherein an absence of harmonically resonant vibrations at discrete rotational speeds is determined by a method comprising:
selecting the set of discrete throttle settings for the engine, wherein the selected discrete throttle settings correlate to discrete rotational speeds of the turbocharger;

modeling the turbocharger for the engine, including modeling of the turbine stage thereof for vibration analysis, said modeling of the turbine stage further comprising modeling of turbine blades of a turbine wheel and modeling turbine nozzle vanes;

determining one or more natural frequencies of vibration of the turbine blades for each of the throttle settings;

determining a turbine nozzle vane induced turbine blade excitation frequency as a function of the turbocharger rotational speed at that throttle setting; and ascertaining whether a data coincidence is present at each of the throttle settings, said step of ascertaining comprising determining whether, at the rotational speed corresponding to that throttle setting, there is a data coincidence of said one or more natural frequencies of vibration and said turbine nozzle vane induced turbine blade excitation frequency;

wherein if there is an absence of said data coincidence at each of the throttle settings, the turbine stage fabricated according to said step of ascertaining will have turbine blades which are at least substantially free of harmonically resonant vibrations at the discrete rotational speeds of the turbocharger; and wherein when a presence of any data coincidence is determined by the step of ascertaining, modifying at least one of configuration and material composition of the turbine blades; and repeating:

the step of modeling, wherein the repeating of said step of modeling comprises remodeling of turbine blades of the turbine wheel for vibration analysis;

the step of determining one or more natural frequencies of vibration of the turbine blades for each of the throttle settings;

the step of determining the turbine nozzle vane induced turbine blade excitation frequency as a function of the turbocharger rotational speed at that throttle setting;

the step of ascertaining whether a data coincidence is present at each of the throttle settings; and the step of modifying at least one of configuration and material composition of the turbine blades;

until the absence of data coincidence at the rotational speed corresponding to each throttle setting is obtained.

12. A turbocharger turbine stage for a diesel engine fabricated such that it is free of harmonically resonant vibrations at a set of discrete rotational speeds of the turbocharger corresponding to a set of discrete throttle settings for the engine, wherein an absence of harmonically resonant vibrations at discrete rotational speeds is determined by a method comprising:

selecting the set of discrete throttle settings for the engine, wherein the selected discrete throttle settings correlate to discrete rotational speeds of the turbocharger;

modeling the turbocharger for the engine, including modeling of the turbine stage thereof for vibration analysis, said modeling of the turbine stage further comprising modeling of turbine blades of a turbine wheel and modeling turbine nozzle vanes;

determining one or more natural frequencies of vibration of the turbine blades for each of the throttle settings;

determining a turbine nozzle vane induced turbine blade excitation frequency as a function of the turbocharger rotational speed at that throttle setting; and ascertaining whether a data coincidence is present at each of the throttle settings, said step of ascertaining comprising determining whether, at the rotational speed corresponding to that throttle setting, there is a data coincidence of said one or more natural frequencies of vibration and said turbine nozzle vane induced turbine blade excitation frequency;

wherein if there is an absence of said data coincidence at each of the throttle settings, the turbine stage fabricated according to said step of ascertaining will have turbine blades which are at least substantially free of harmonically resonant vibrations at the discrete rotational speeds of the turbocharger; and wherein when a presence of any data coincidence is determined by the step of ascertaining, changing the number of said turbine nozzle vanes and remodeling turbine nozzle vanes such that there are no harmonically resonant vibrations at the discrete rotational speeds of the turbocharger corresponding to discrete throttle settings of the diesel engine;

wherein an odd, prime number of turbine nozzle vanes is selected when changing the number of said turbine nozzle vanes.

13. A method for fabrication of a diesel engine turbocharger turbine stage, comprising the steps of:

selecting a set of discrete throttle settings for the engine, wherein the selected discrete throttle settings correlate to discrete rotational speeds of the turbocharger;

modeling the turbocharger for the engine, including modeling of the turbine stage thereof for vibration analysis, said modeling of the turbine stage further comprising modeling of turbine blades of a turbine wheel and modeling turbine nozzle vanes;

determining one or more natural frequencies of vibration of the turbine blades for each of the throttle settings;

determining a turbine nozzle vane induced turbine blade excitation frequency as a function of the turbocharger rotational speed at that throttle setting; and ascertaining whether a data coincidence is present at each of the throttle settings, said step of ascertaining comprising determining whether, at the rotational speed corresponding to that throttle setting, there is a data coincidence of said one or more natural frequencies of vibration and said turbine nozzle vane induced turbine blade excitation frequency;

wherein the data coincidence comprises a predetermined range of proximity of the rotational speed corresponding to each throttle setting, said one or more natural frequencies of vibration at that throttle setting, and said turbine nozzle vane induced turbine blade excitation frequency at that throttle setting;

wherein if there is an absence of said data coincidence at each of the throttle settings, the turbine stage fabricated according to said step of ascertaining will have turbine blades which are at least substantially free of harmonically resonant vibrations at the discrete rotational speeds of the turbocharger; and wherein when a presence of any data coincidence is determined by the step of ascertaining, performing one of redesigning the turbine blades of the turbine wheel and redesigning turbine nozzle vanes;

wherein redesigning the turbine blades of the turbine wheel comprises:

modifying at least one of configuration and material composition of the turbine blades; and repeating:

the step of modeling, wherein the repeating of said step of modeling comprises remodeling of turbine blades of the turbine wheel for vibration analysis;

the step of determining one or more natural frequencies of vibration of the turbine blades for each of the throttle settings;

the step of determining the turbine nozzle vane induced turbine blade excitation frequency as a function of the turbocharger rotational speed at that throttle setting;

the step of ascertaining whether a data coincidence is present at each of the throttle settings; and the step of modifying at least one of configuration and material composition of the turbine blades;

until the absence of data coincidence at the rotational speed corresponding to each throttle setting is obtained; and wherein redesigning turbine nozzle vanes comprises:

changing the number of said turbine nozzle vanes and remodeling turbine nozzle vanes;

wherein the step of remodeling of the turbine nozzle vanes includes selecting an odd, prime number of turbine nozzle vanes.

14. The method of claim 13, further comprising fabricating the turbocharger according to said step of ascertaining whether a data coincidence is present at each of the throttle settings for the engine, wherein said step of ascertaining indicates that the turbocharger is free of said data coincidence at each of the throttle settings, indicating absence of harmonically resonant vibrations at the discrete rotational speeds of the turbocharger.

15. The method of claim 13, further comprising selecting a new throttle setting without encountering a data coincidence such that the turbocharger remains within a region of safe operation.

16. The method of claim 15, further comprising fabricating the turbocharger according to said steps of redesigning, modeling and modifying, wherein said step of ascertaining indicates that the turbocharger is free of said data coincidence at each of the throttle settings, indicating absence of harmonically resonant vibrations at the discrete rotational speeds of the turbocharger.

* * * * *